(12) United States Patent
Cervone

(10) Patent No.: US 12,196,012 B2
(45) Date of Patent: Jan. 14, 2025

(54) VEHICULAR EXTERIOR ACTUATOR WITH RATCHET MECHANISM

(71) Applicant: Magna Mirrors of America, Inc., Holland, MI (US)

(72) Inventor: Connor G. Cervone, Byron Center, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 226 days.

(21) Appl. No.: 17/814,237

(22) Filed: Jul. 22, 2022

(65) Prior Publication Data

US 2023/0027125 A1 Jan. 26, 2023

Related U.S. Application Data

(60) Provisional application No. 63/203,424, filed on Jul. 22, 2021.

(51) Int. Cl.
| | |
|---|---|
| *E05B 79/20* | (2014.01) |
| *E05B 81/04* | (2014.01) |
| *E05B 81/12* | (2014.01) |
| *E05B 81/18* | (2014.01) |
| *E05B 81/24* | (2014.01) |
| *E05B 85/10* | (2014.01) |
| *F16C 1/10* | (2006.01) |

(52) U.S. Cl.
CPC ............. *E05B 81/13* (2013.01); *E05B 79/20* (2013.01); *E05B 81/04* (2013.01); *E05B 81/18* (2013.01); *E05B 81/25* (2013.01); *E05B 85/107* (2013.01); *F16C 1/106* (2013.01)

(58) Field of Classification Search
CPC .......... E05B 81/13; E05B 81/04; E05B 81/18; E05B 81/25; E05B 81/06; E05B 79/20; E05B 15/0046; E05B 15/04; E05B 85/107; E05B 81/20; E05B 81/34; E05B 81/46; F16C 1/106; F16C 2350/52; F16C 1/223; F16C 1/233
See application file for complete search history.

(56) References Cited

U.S. PATENT DOCUMENTS

| | | |
|---|---|---|
| 5,371,659 A | 12/1994 | Pastrick et al. |
| 5,497,305 A | 3/1996 | Pastrick et al. |
| 5,497,306 A | 3/1996 | Pastrick |

(Continued)

*Primary Examiner* — Michael P Ferguson
*Assistant Examiner* — Thomas L Neubauer
(74) *Attorney, Agent, or Firm* — HONIGMAN LLP

(57) ABSTRACT

A vehicular exterior door handle assembly includes a base, a handle movable relative to the base between recessed and deployed positions, an actuator that is operable to move the handle between the positions, and a connection mechanism that pivots relative to the base to move the handle between the positions. The actuator operates to pull and release a cable to pivot the connection mechanism to move the handle. The connection mechanism, when the actuator is operated to pull the cable, pivots in a first direction to move the handle from the recessed toward the deployed position. A biasing element of the connection mechanism biases the connection mechanism in a second direction to move the handle toward the recessed position when the actuator releases the cable. Responsive to cable tension being reduced by a threshold amount, the connection mechanism adjusts to increase tension.

20 Claims, 16 Drawing Sheets

(56) References Cited

U.S. PATENT DOCUMENTS

| | | |
|---|---|---|
| 5,669,699 A | 9/1997 | Pastrick et al. |
| 5,671,996 A | 9/1997 | Bos et al. |
| 5,786,772 A | 7/1998 | Schofield et al. |
| 5,823,654 A | 10/1998 | Pastrick et al. |
| 5,929,786 A | 7/1999 | Schofield et al. |
| 5,938,321 A | 8/1999 | Bos et al. |
| 6,086,229 A | 7/2000 | Pastrick |
| 6,139,172 A | 10/2000 | Bos et al. |
| 6,149,287 A | 11/2000 | Pastrick et al. |
| 6,152,590 A | 11/2000 | Furst et al. |
| 6,176,602 B1 | 1/2001 | Pastrick et al. |
| 6,198,409 B1 | 3/2001 | Schofield et al. |
| 6,227,689 B1 | 5/2001 | Miller |
| 6,276,821 B1 | 8/2001 | Pastrick et al. |
| 6,280,069 B1 | 8/2001 | Pastrick et al. |
| 6,291,905 B1 | 9/2001 | Drummond et al. |
| 6,349,450 B1 | 2/2002 | Koops et al. |
| 6,396,408 B2 | 5/2002 | Drummond et al. |
| 6,416,208 B2 | 7/2002 | Pastrick et al. |
| 6,477,464 B2 | 11/2002 | McCarthy et al. |
| 6,550,103 B2 | 4/2003 | Koops et al. |
| 6,568,839 B1 | 5/2003 | Pastrick et al. |
| 6,582,109 B2 | 6/2003 | Miller |
| 6,907,643 B2 | 6/2005 | Koops et al. |
| 6,977,619 B2 | 12/2005 | March et al. |
| 7,407,203 B2 | 8/2008 | Huizenga et al. |
| 7,492,281 B2 | 2/2009 | Lynam et al. |
| 7,581,859 B2 | 9/2009 | Lynam |
| 7,626,749 B2 | 12/2009 | Baur et al. |
| 7,944,371 B2 | 5/2011 | Foote et al. |
| 8,058,977 B2 | 11/2011 | Lynam |
| 8,333,492 B2 | 12/2012 | Dingman et al. |
| 8,786,401 B2 | 7/2014 | Sobecki et al. |
| 8,786,704 B2 | 7/2014 | Foote et al. |
| 11,371,270 B2 | 6/2022 | Leonardi et al. |
| 11,885,158 B2 | 1/2024 | Cumbo et al. |
| 2010/0007463 A1 | 1/2010 | Dingman et al. |
| 2020/0102773 A1 | 4/2020 | Sobecki |
| 2020/0199916 A1* | 6/2020 | Cumbo .................. E05B 81/25 |
| 2021/0062556 A1* | 3/2021 | Mensch .................. E05B 81/06 |
| 2021/0156179 A1* | 5/2021 | Savant .................. E05B 85/107 |
| 2022/0282534 A1 | 9/2022 | Peterson et al. |

\* cited by examiner

- At 300N cable stretch tolerance
  - ~3-5mm
- Lifetime stretch tolerance
  - ~2mm
- Door handle and cable routing tolerance
  - ~3-4mm
- Conduit compression tolerance
  - ~1-2mm

| Total Cable Travel | 19.5 |
| --- | --- |
| Tolerance | 10 |
| Radius | 29.47 |

| | Degrees | Cable Travel | Total |
| --- | --- | --- | --- |
| Detent Degrees | 9.7 | 4.99 | N/A |
| Total Detents (end of life) | 19.44 | 10 | 2 |
| Total Degrees of travel | 37.92 | 19.5 | N/A |
| Total minus Detent | 28.22 | 14.51 | N/A |

$$F_{x_t} = \frac{T_1}{(r)}(\sin(\theta_2) - \cos(\theta_2)\mu)$$

$$F_{x_c} = k(x+d) * \cos(\theta_2) + k(x+d) * \sin(\theta_2)\mu$$

$$F_{x_c} < F_{x_t}$$

$$F_{x_c} = \frac{T_1}{r}(\sin(\theta_2) - \cos(\theta_2)\mu)$$
$$F_{x_r} = k(x+d) * \cos(\theta_2) + k(x+d) * \sin(\theta_2)\mu$$

$$F_{x_c} < F_{x_r}$$

- Torsion

| | 1 | 2 |
|---|---|---|
| Deflection (deg) | 170 | 252 |
| Torque (Nmm) | 199.31 | 295.44 |

- Compression

| | 1 | 2 |
|---|---|---|
| Length (mm) | 28.50 | 26.04 |
| Load (N) | 1.935 | 5.108 |
| Deflection (mm) | 1.5 | 3.96 |

VEHICULAR EXTERIOR ACTUATOR WITH RATCHET MECHANISM

CROSS REFERENCE TO RELATED APPLICATION

The present application claims the filing benefits of U.S. provisional application Ser. No. 63/203,424, filed Jul. 22, 2021, which is hereby incorporated herein by reference in its entirety.

FIELD OF THE INVENTION

The present invention relates to door handles for vehicles and, more particularly, to an exterior door handle for opening a side door and/or liftgate of a vehicle.

BACKGROUND OF THE INVENTION

A door handle for a vehicle door typically includes a handle portion that is pivotable relative to a base portion, whereby pivotal movement of the handle portion actuates a latch mechanism to open the door. Typically, a door handle is a pull strap handle with a strap handle portion that protrudes outwardly from the side of the vehicle for grasping by the person opening the door of the vehicle. Alternately, paddle type door handle assemblies are known, where a paddle portion is pivotally mounted to a base portion and is pulled generally outwardly and upwardly to open the vehicle door. Such paddle type door handle assemblies typically protrude outwardly from the vehicle door when in their unpulled state and have an open recess below the paddle portion for receiving a user's fingers for grasping the paddle portion.

SUMMARY OF THE INVENTION

A door handle assembly for a door of a vehicle includes a handle portion that is movable via an actuator between a recessed or retracted or non-use position, where the handle is retracted so that an outer surface of the door handle is coplanar with an outer surface of the door, and a deployed or extended or use position, where the handle is extended from the outer surface of the door so that the handle portion may be grasped by a user. The handle portion is movable between the recessed and the deployed positions via an actuator that is disposed remote from the door handle region of the vehicle and that is operable to move the handle via a connection mechanism. The connection mechanism attaches to the actuator via a connection cable and includes a detent or a ratchet design to accommodate tolerances of the connection cable and to take up slack in the cable to account for cable stretch over the lifetime of the door and/or vehicle.

For example, a vehicular exterior door handle assembly includes a base portion disposed at a door handle region of a vehicle door. A handle portion is movable relative to the base portion between a recessed position, where a grasping portion of the handle portion is recessed at the base portion so as to not be graspable by a user, and a deployed position, where the grasping portion of the handle portion protrudes or extends outward from the base portion to be graspable by the user. An actuator is electrically operable to move the handle portion between the recessed position and the deployed position. A connection mechanism, when the actuator is electrically operated, pivots relative to the base portion to move the handle portion between the recessed position and the deployed position. The actuator operates to pull and release a cable to pivot the connection mechanism to move the handle portion between the recessed position and the deployed position. The connection mechanism, when the actuator is electrically operated to pull the cable, pivots in a first direction to move the handle portion from the recessed position toward the deployed position. The connection mechanism includes a biasing element that biases the connection mechanism in a second direction to move the handle portion toward the recessed position when the actuator releases the cable. Responsive to tension in the cable being reduced by a threshold amount, the connection mechanism adjusts to increase tension in the cable.

These and other objects, advantages, purposes and features of the present invention will become apparent upon review of the following specification in conjunction with the drawings.

DESCRIPTION OF THE PREFERRED EMBODIMENTS

Figure 1:
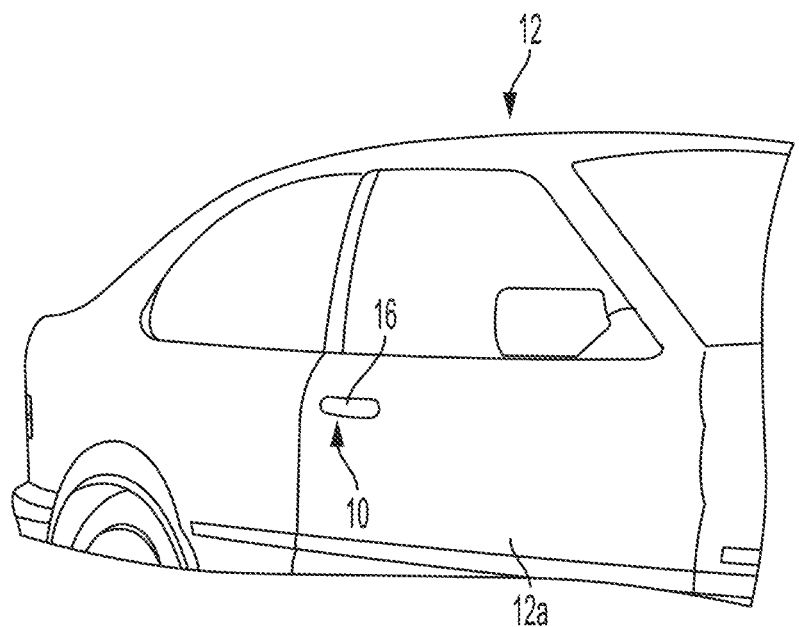
FIG. 1 is a perspective view of a vehicle with an exterior door handle assembly.
Figure 2:
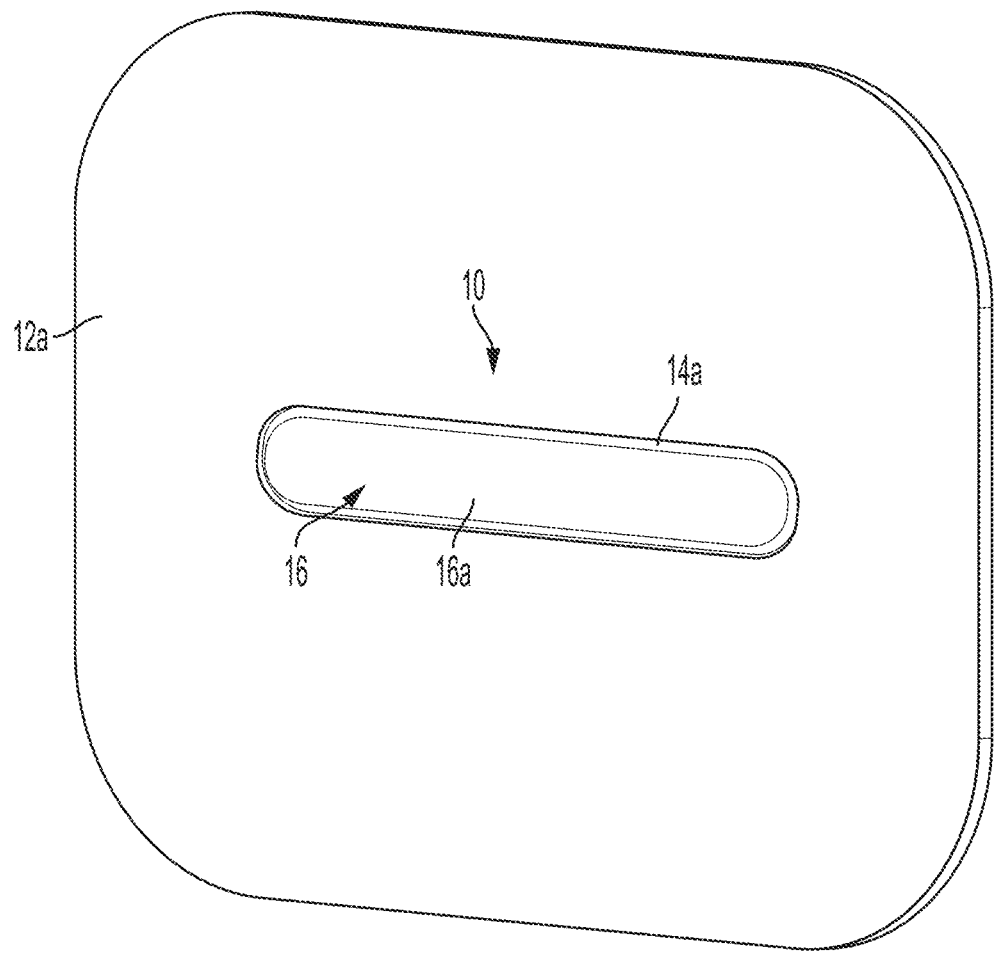
FIG. 2 is an enlarged perspective view of the exterior door handle assembly of FIG. 1, with the door handle in its flush or non-use or recessed position.

Referring now to the drawings and the illustrative embodiments depicted therein, a vehicle exterior door handle assembly or module or unit or flush door handle assembly 10 is mountable to a door 12a of a vehicle 12 and operable to release a latch mechanism of the door 12a to open the vehicle door (FIG. 1). The vehicle door handle assembly 10 includes a base portion or bracket portion 14 that is mountable to the door and a handle or strap portion 16 that is pivotally mounted to the base portion 14. When not in use, the handle portion 16 is at an initial rest or recessed or non-use position (FIG. 2) and is received or disposed at or partially in the base portion 14 so that an outer surface 16a of the handle portion 16 is generally flush with or generally coplanar with (or protruding only slightly from or recessed slightly from) the outer surface 14a of the base portion 14 or the door panel, whereby the handle portion 16 is not readily usable by a user. The handle portion 16 is electromechanically pivotable or movable or laterally movable relative to the door and the base portion 14 to move to its ready or operational or grippable or graspable or person-operable or deployed position (FIG. 3) and is then graspable or grippable by a user and is manually moved (such as via pulling by the user) to actuate a latch mechanism of the door to open the vehicle door. The handle assembly 10 includes an electrically operable or electromechanical actuator 20 for imparting the lateral movement of the handle portion 16 relative to the base portion 14 (such as automatically imparting such handle movement in response to a signal from a key fob or a passive entry system or the like) so that the handle portion 16 is automatically moved from its recessed position to its ready or graspable position where a user can grasp the handle portion to pull or move the handle portion for unlatching and/or opening the vehicle door and/or the like, as discussed below.

The door handle assembly 10 may comprise any suitable type of handle assembly, and may include or incorporate aspects of the door handle assemblies described in U.S. Pat. Nos. 8,786,401; 6,977,619; 7,407,203 and/or 8,333,492, and/or U.S. Publication Nos. US-2020-0102773 and/or US-2020-0199916, and/or U.S. patent application Ser. No. 17/653,142, filed Mar. 2, 2022, which published on Sep. 8, 2022 as U.S. Patent Publication No. US-2022-0282534, which are all hereby incorporated herein by reference in their entireties. Optionally, aspects of the door handle assembly 10 may be suitable for use with a liftgate handle assembly for a liftgate or tailgate of a vehicle. The handle assembly may comprise any suitable type of vehicle door handle assembly, such as a paddle type vehicle door handle assembly (having a paddle or the like that may be pulled at to open the vehicle door) or other type of vehicle door handle assembly.

Figure 3:
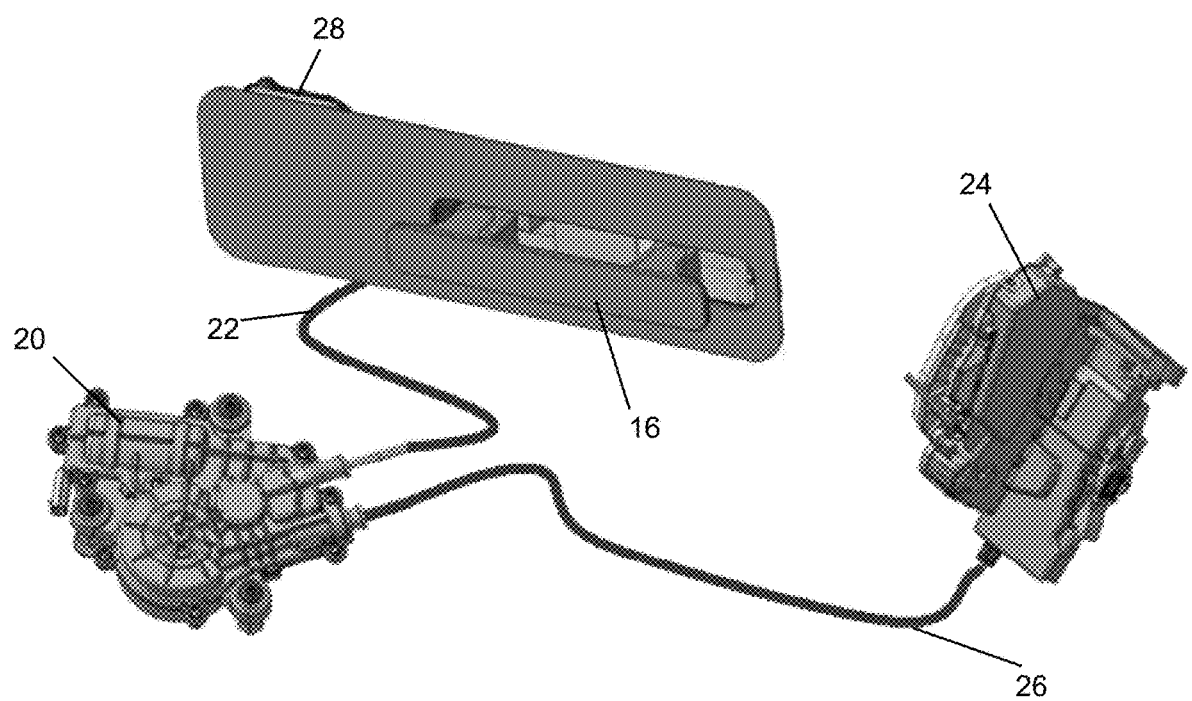
FIG. 3 is a perspective view of the exterior door handle assembly, a latch mechanism of the vehicular door, and a remote actuator configured to operate the door handle assembly and the latch mechanism.
Figure 4:
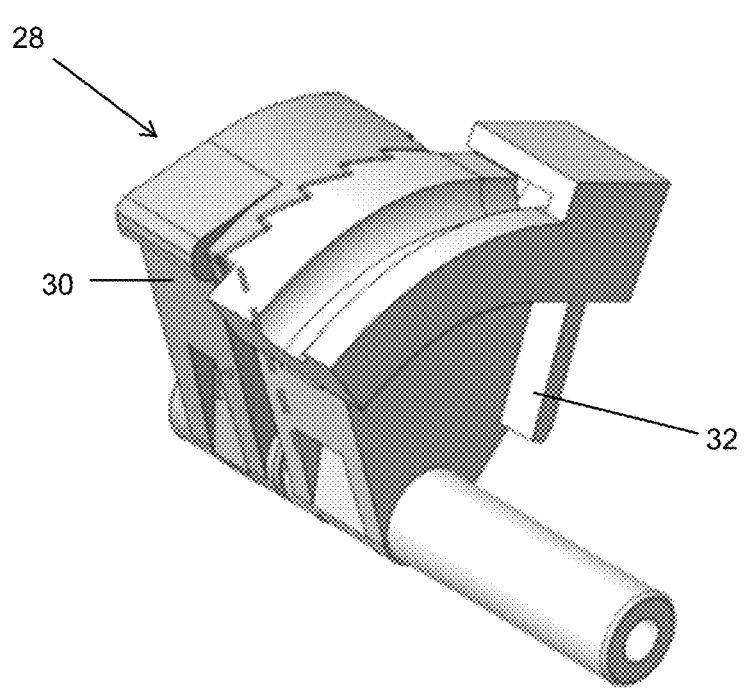
FIG. 4 is a perspective view of the connection mechanism of the exterior door handle assembly.

As shown in FIG. 3, the actuator 20 is mounted remotely from the door handle assembly 10 (such as at a base of the door) and is attached or connected to or imparts movement of the handle portion 16 via a pivot or connection mechanism 28 having a ratchet or detent design (FIG. 4). The actuator 20 is connected to the connection mechanism 28 via a connection cable or handle pull cable 22, which has an inner cable 40 that is movable relative to an outer sheath via actuation of the actuator. The outer sheath is attached at the base portion of the handle assembly and the inner cable is attached at the connection mechanism. Utilizing the remotely mounted actuator to drive the flush door handle provides significant packaging size reduction for the door handle assembly. As will be discussed below, the connection mechanism 28 allows the actuator 20 to deploy and/or retract the flush door handle assembly while disposed remote from the door handle assembly and the ratchet or detent design accommodates tolerances or stretch of the inner cable (such as about 10 mm or up to 20 mm of tolerance or total travel of the cable) so as to maintain a tension in the cable when the handle portion is moved between the recessed position and the deployed position. Accommodating for cable stretch and other cable tolerances helps to ensure a consistent deployment of the handle portion 16 over the lifetime of the handle assembly.

Figure 5:
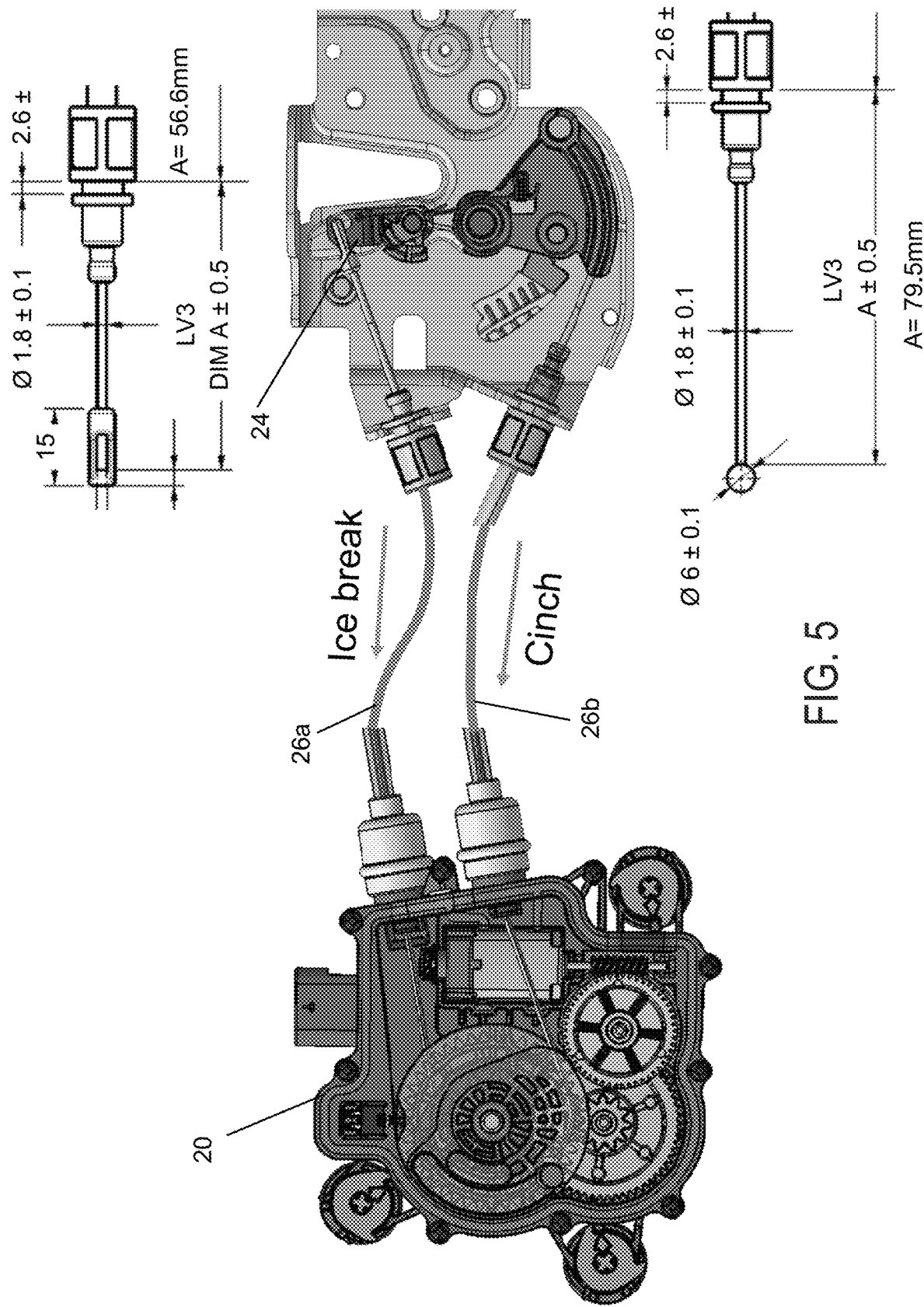
FIG. 5 is a schematic of the remote actuator and the latch mechanism.
Figure 6:
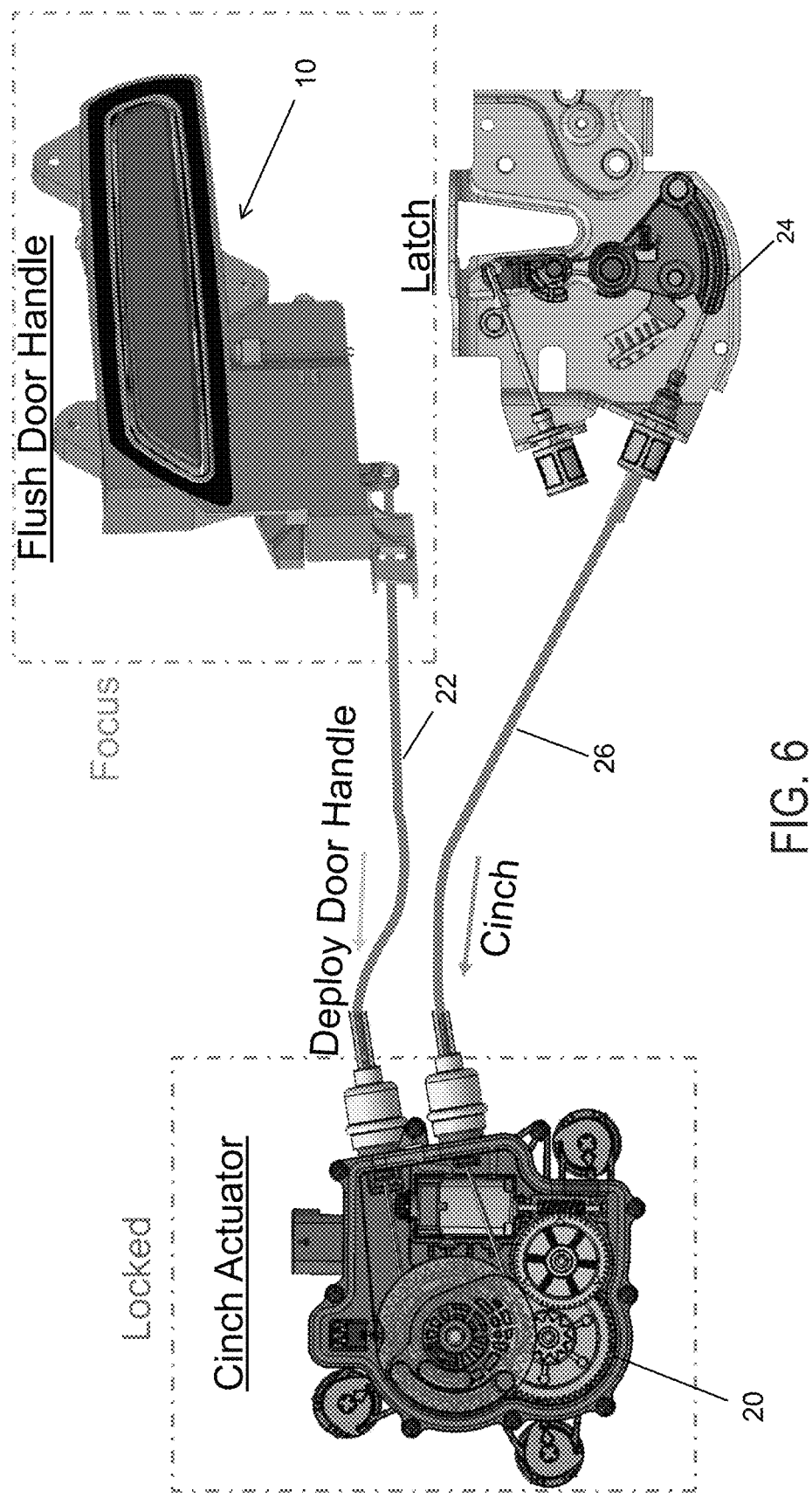
FIG. 6 is a schematic of the remote actuator, latch mechanism, and the exterior door handle assembly.

The actuator 20 operates to move the handle portion between the recessed position and the deployed position via the handle pull cable 22. Optionally, the actuator is operable to provide other functions at the vehicle door, such as operating a latch mechanism 24 via a latch pull cable 26. For example, the actuator may be operable to cinch the latch mechanism 24 via a first latch pull cable 26a and provide an ice break function of the latch mechanism via a second latch pull cable 26b (FIG. 5). The actuator 20 may utilize aspects of the remote actuators described in U.S. Publication No. US-2018-0051502, which is hereby incorporated herein by reference in its entirety. Thus, the actuator 20 is operable to deploy and/or retract the handle portion 16 of the door handle assembly 10 via the first or handle pull cable 22 and may operate the latch mechanism 24 (such as a cinch function of the latch mechanism) via the second or latch pull cable 26 (FIG. 6). Although FIG. 6 depicts the second pull cable 26 as routed between the actuator and a position below the handle assembly 10, it should be understood that the actuator may be positioned relative to the door handle assembly in any suitable manner with the cable 26 routed accordingly.

Figure 7:
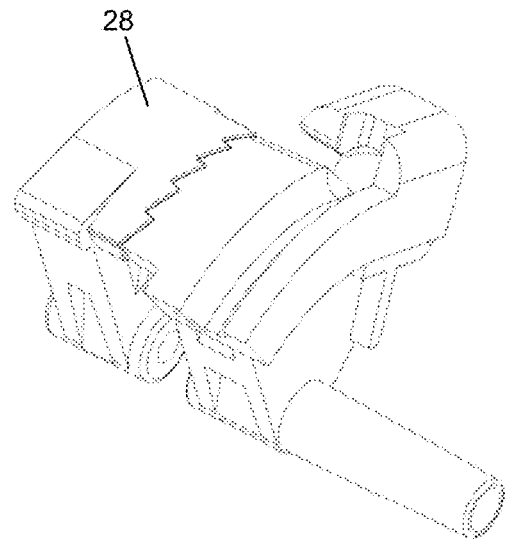
FIG. 7 is a perspective view of a connection mechanism of the exterior door handle assembly, shown in an initial or default or non-ratcheted position.

The pivot or connection mechanism 28 is mounted at the base portion 14 of the handle assembly and pivots relative to the base portion responsive to operation of the actuator 20. As shown in FIG. 7, the connection mechanism 28 comprises a ratchet portion 30 and a connection portion 32 keyed together at a ratchet or detent interface and separately pivotally mounted relative to the base portion 14. As will be discussed below, the ratchet portion 30 is configured to engage a portion or component of the handle assembly so that when the connection mechanism 28 is pivoted relative to the base portion 14, the handle portion 16 is moved between the recessed position and the deployed position. The connection portion 32 pivots about a pivot tube or post 34 of the connection portion 32 and includes a connection arm or element 36 that receives an end of the inner cable 40 of the handle pull cable 22. In the illustrated embodiment, the connection portion 32 includes a cable channel 38 that receives and/or routes the inner cable 40 along the connection arm 36. The outer sheath of the cable 22 is retained at a cable holding portion 41 (FIG. 11), such that movement of the inner cable 40 when the actuator is operated pulls the connection arm 36 toward the cable holding portion 41.

Figure 8:
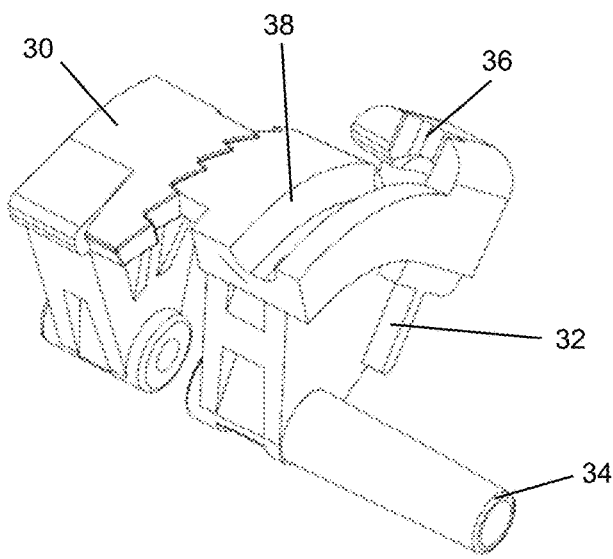
FIG. 8 is a perspective view of the connection mechanism, shown in a ratcheted position.

The ratcheting portion 30 and the connection portion 32 are keyed together such that the ratcheting portion allows the connection portion to pivot in a first direction relative to the ratcheting portion, but the connection portion is precluded by the ratcheting portion from pivoting relative to the ratcheting portion in a second direction that is opposite the first direction. In other words, the connection portion 32 is only capable of pivoting in one direction relative to the ratcheting portion 30. When the connection portion 32 pivots in the second direction, the ratcheting portion 30 pivots with the connection portion. The ratchet or detent interface (e.g., a plurality of ramped teeth defining the engagement surface of the ratchet portion and the connection portion) is stepped or keyed such that as the connection portion 32 pivots relative to the ratcheting portion 30, the connection portion will become locked at a given angle of rotation relative to the ratcheting portion and may not pivot back beyond its current step of rotation. Thus, the connection mechanism 28 may be pivoted from a default or non-ratcheted position (FIG. 7) to one of a plurality of ratcheted positions (e.g., FIG. 8) defined by the number of ramped teeth present along the ratchet interface. As will be discussed below, this accommodates tolerances or cable stretch of the inner cable 40 to maintain a tension in the inner cable when the handle portion 16 is moved between the recessed position and the deployed position.

Figure 9:
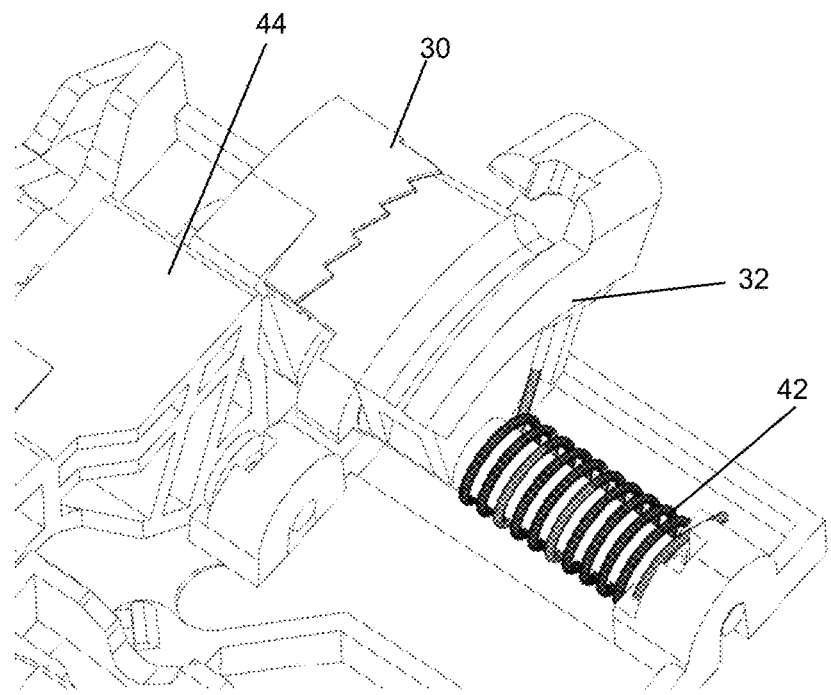
FIG. 9 is an enlarged perspective view of the connection mechanism mounted at the base portion of the exterior door handle assembly, shown in the non-ratcheted position.
Figure 10:
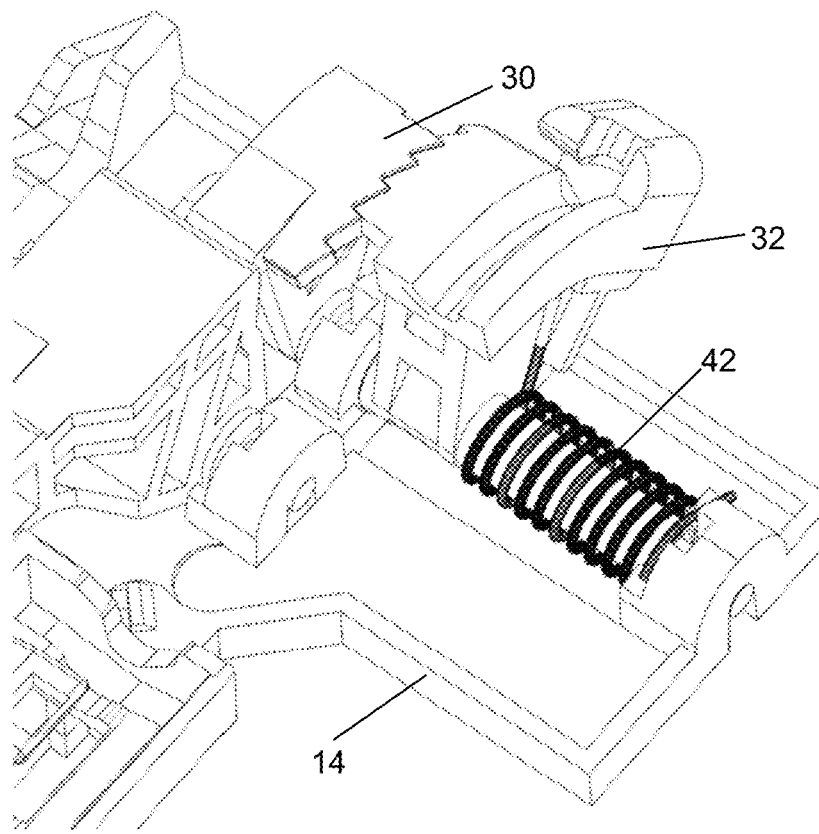
FIG. 10 is an enlarged perspective view of the connection mechanism mounted at the base portion, shown in a ratcheted position with the handle portion in the recessed position.
Figure 11:
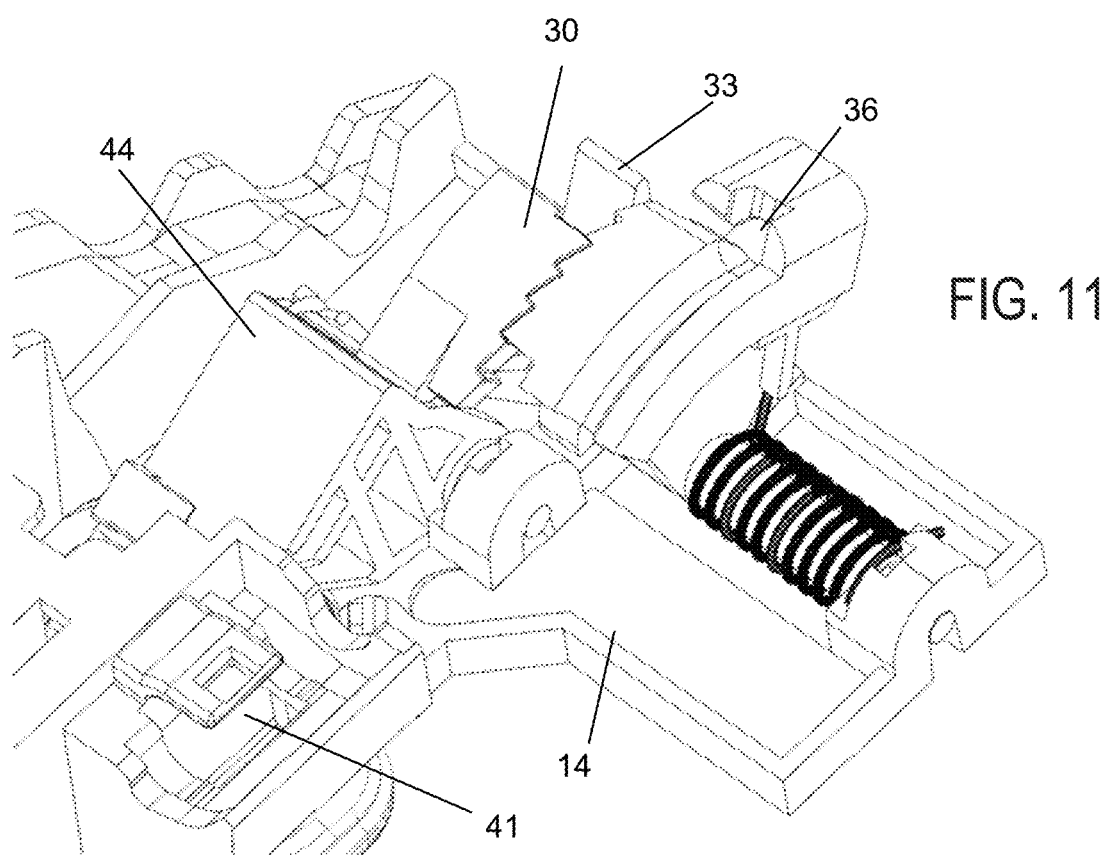
FIG. 11 is an enlarged perspective view of the connection mechanism mounted at the base portion, shown in a ratcheted position with the handle portion in the deployed position.
Figure 12:
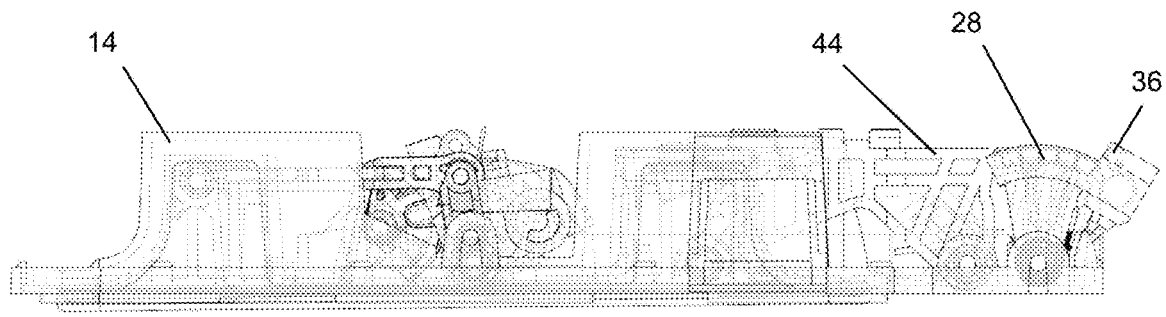
FIG. 12 is a partial plan view of the exterior door handle assembly, shown with the handle portion in the recessed position.

As shown in FIGS. 9-11, a biasing element 42 (such as a torsion spring) is disposed at the pivot tube 34 and biases the connection portion 32 relative to the base portion and the ratcheting portion 30 in the first direction (away from the cable holding portion so as to pull at the inner cable). The biasing element 42 may also bias or urge the connection portion 32 into engagement with the ratcheting portion 30 to maintain engagement of the ratcheting interface (optionally, a separate compression spring or coil spring may be provided that urges the connection portion and the ratcheting portion together). The tension in the inner cable 40 attached at the connection portion 32 (such as when the actuator is actuated to deploy the handle) pulls or biases the connection portion in the second direction against the biasing force of the torsion spring.

Thus, for the connection portion 32 to pivot from the non-ratcheting position to a ratcheted position, the biasing force of the torsion spring 42 must overcome the tension of the inner cable 40. In other words, and such as shown in FIG. 9, when the connection mechanism 28 is in the default position (such as upon an initial installation of the door handle assembly at a vehicle), the tension in the inner cable 40 works against the biasing force of the torsion spring 42 to maintain the connection mechanism 28 in the default position. Over the life of the door handle assembly, the inner cable 40 may stretch and the tension in the inner cable 40 may decrease, whereby the torsion spring 42 overcomes the tension in the cable 40 and ratchets the connection portion 32 relative to the ratcheting portion 30 to maintain or restore tension in the inner cable (FIG. 10). Maintaining tension (or limiting or eliminating slack) in the inner cable 40 ensures consistent deployment of the handle portion 16 over the life of the handle assembly. Otherwise, if the connection mechanism 28 did not account for loss of tension in the inner cable, due to cable stretch or other tolerances, deployment of the handle portion 16 may be delayed or incomplete.

When the actuator 20 is operated to move the handle portion 16 from the recessed position to the deployed position, the inner cable 40 pulls at the connection mechanism 28 and the connection mechanism 28 (both the ratcheting portion and the connection portion) rotates or pivots about the pivot tube 34 in the second direction (i.e., against the biasing force of the torsion spring), with the ratcheting portion 30 engaging a crank or hammer or pivoting element 44 of the handle assembly to move the handle portion 16 to the deployed position. The connection mechanism 28 maintains its orientation relative to the connection portion 32 between the default and ratcheted positions during operation of the actuator. Because the cable 40 is pulling at the connection mechanism 28 to move the handle portion from the recessed position to the deployed position, the inner cable 40 remains taut between the handle assembly and the connection portion 32. When the actuator operates in the opposite direction (e.g., releases tension in the cable 40), the connection mechanism 28 pivots in the first direction and the handle portion returns to the recessed position responsive at least in part due to the spring force applied by the torsion spring 42.

The biasing force of the torsion spring 42 ensures that the proper tension in the inner cable 40 is provided once the handle is in the recessed position. When the handle is in the recessed position, the torsion spring 42 biases the connection portion 32 in the first direction against the tension in the inner cable 40. If the tension in the inner cable is high enough, the connection portion 32 maintains its pivotal position relative to the ratcheting portion 30 (FIG. 9). If the tension in the inner cable 40 is not high enough, such as due to stretch in the cable, the biasing force of the torsion spring 42 pivots the connection portion 32 further in the first direction relative to the ratcheting portion 30 to pull the cable and thus increasing or restoring tension to an acceptable level (FIG. 10). The ratcheting portion 30 is precluded from pivoting during the ratcheting of the connection portion 32 via engagement of the ratcheting portion with a physical stop 33 of the frame portion 14 (FIG. 11).

Figure 13:
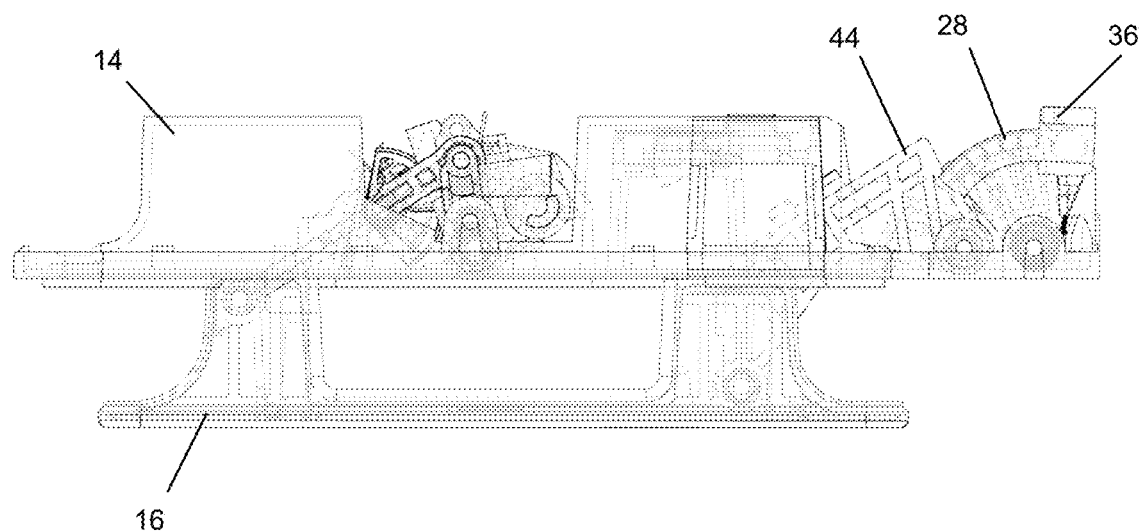
FIG. 13 is a partial plan view of the exterior door handle assembly, shown with the handle portion in the deployed position.
Figure 14:
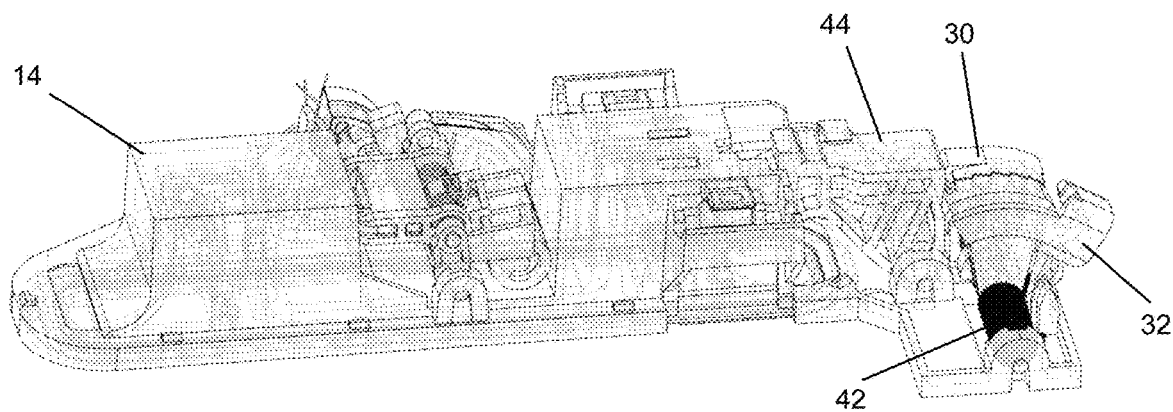
FIG. 14 is a partial perspective view of the exterior door handle assembly, shown with the handle portion in the recessed position.
Figure 15:
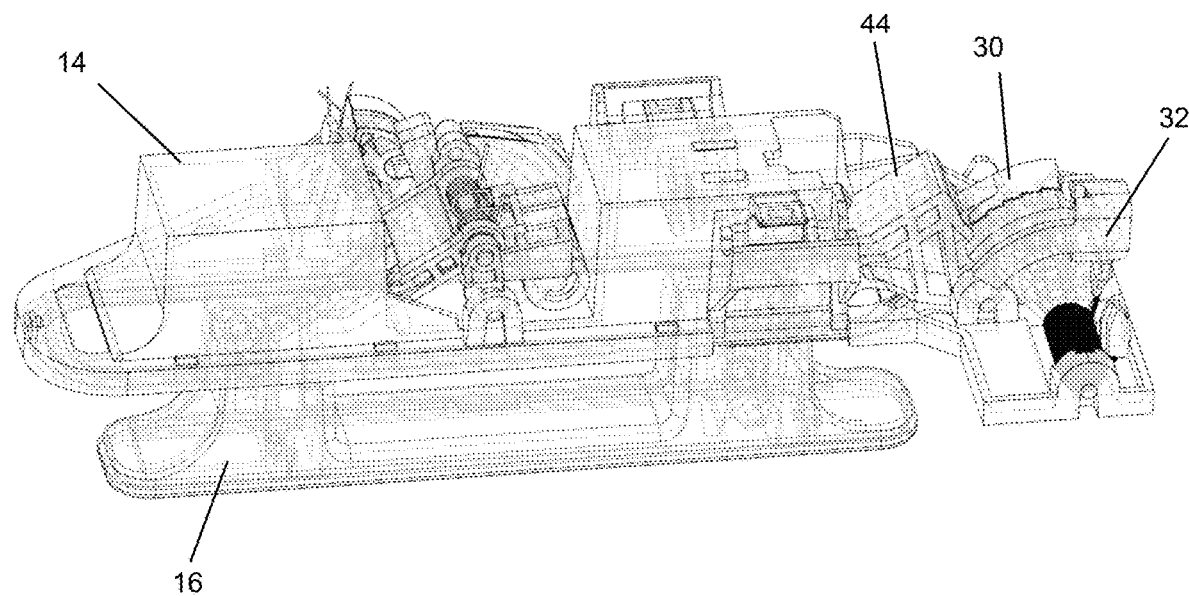
FIG. 15 is a partial perspective view of the exterior door handle assembly, shown with the handle portion in the deployed position.
Figures 16, 16A:
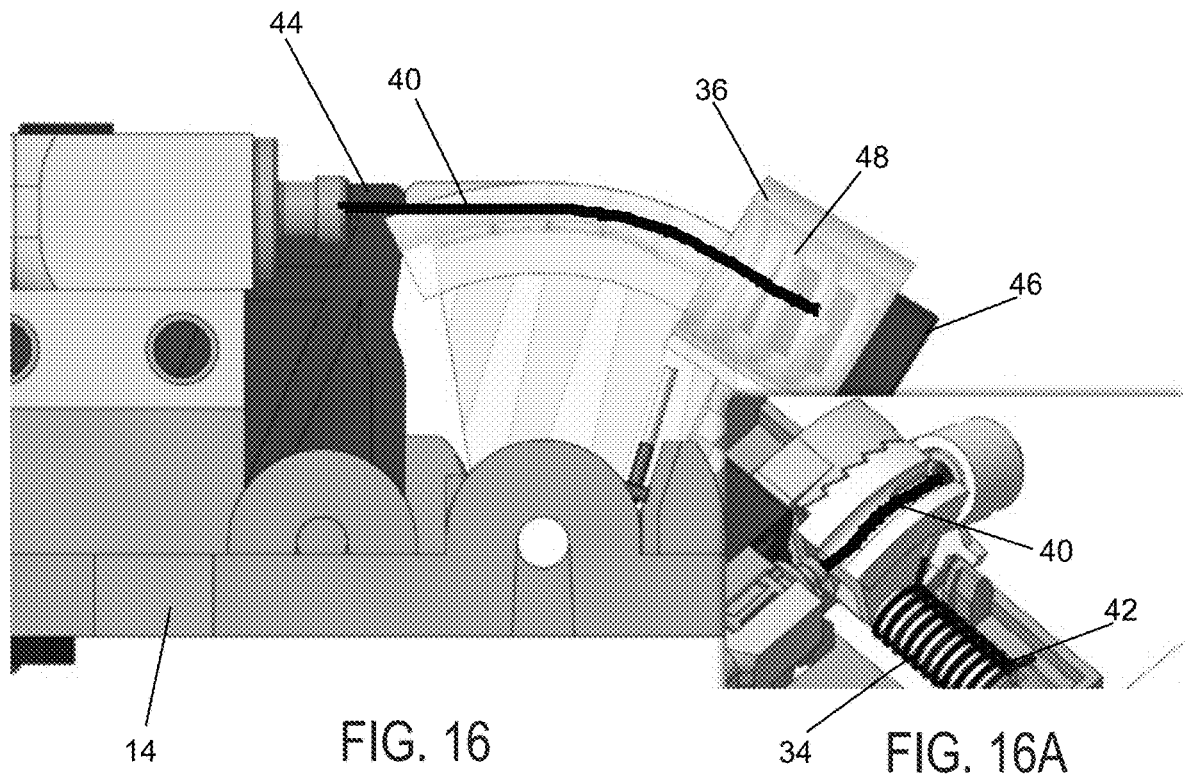
FIG. 16 is an enlarged view of the connection mechanism, shown with the handle portion in the recessed position.
FIG. 16A is a perspective view of the connection mechanism of FIG. 16.
Figures 17, 17A:
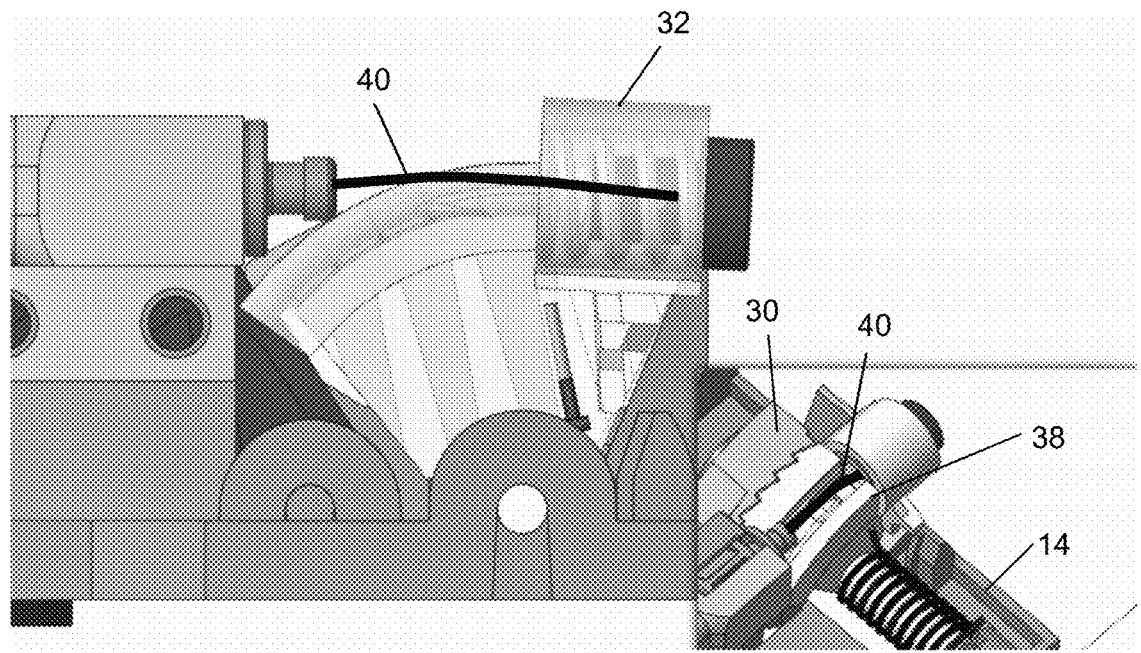
FIG. 17 is an enlarged view of the connection mechanism, shown with the handle portion in a partially deployed position.
FIG. 17A is a perspective view of the connection mechanism of FIG. 17.

As shown in FIGS. 12-15, the crank or hammer or pivoting element 44 is mounted or attached at the base portion 14 and engages a rear surface of the handle portion 16 so that, when the crank 44 is pivoted by the connection mechanism 28, the handle portion 16 is moved between the recessed position (FIG. 12) and the deployed position (FIG. 13). Thus, the crank 44 translates pivotal movement of the connection mechanism 28 to swing or laterally move the handle portion 16 outward from the base portion 14, whereby a user may grasp the handle portion to actuate the latch mechanism of the door.

As shown in FIGS. 16-21A, when the actuator is operated to move the handle portion between the recessed position and the deployed position, the connection mechanism 28 is pivoted relative to the base portion 14 to pivot the crank 44 and deploy the handle portion, with the ratcheting portion 30 maintaining its position relative to the hammer or crank 44 of the door handle assembly regardless of whether the connection portion 32 has been pivoted to a ratcheted position or not. In other words, the default position of the ratcheting portion 30 relative to the crank 44 does not change as the connection portion 32 ratchets relative to the ratcheting portion 30. Thus, the handle portion is moveable between the recessed position (FIGS. 16 and 19) and the deployed position (FIGS. 18 and 21) in a similar manner regardless of whether the connection mechanism 28 is in the default position (FIGS. 16-18A) or a ratcheted position (FIGS. 19-21A).

Figures 18, 18A:
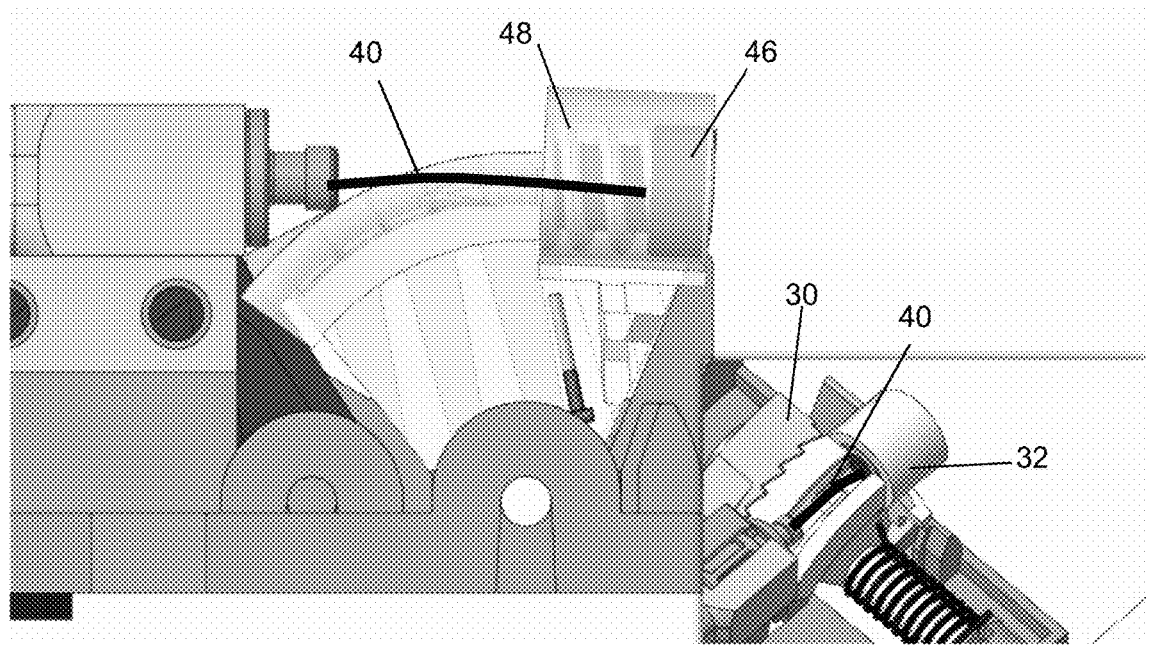
FIG. 18 is an enlarged view of the connection mechanism, shown with the handle portion in a fully deployed position.
FIG. 18A is a perspective view of the connection mechanism of FIG. 18.
Figures 19, 19A:
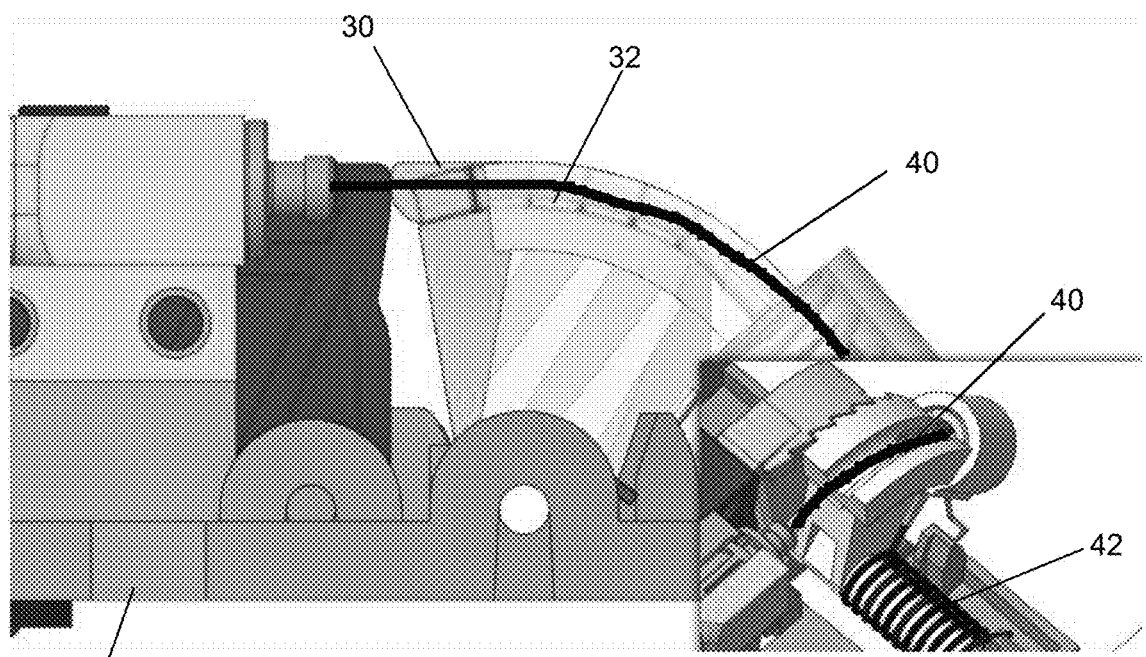
FIG. 19 is an enlarged view of the connection mechanism in a ratcheted position, shown with the handle portion in the recessed position.
FIG. 19A is a perspective view of the connection mechanism of FIG. 19.
Figures 20, 20A:
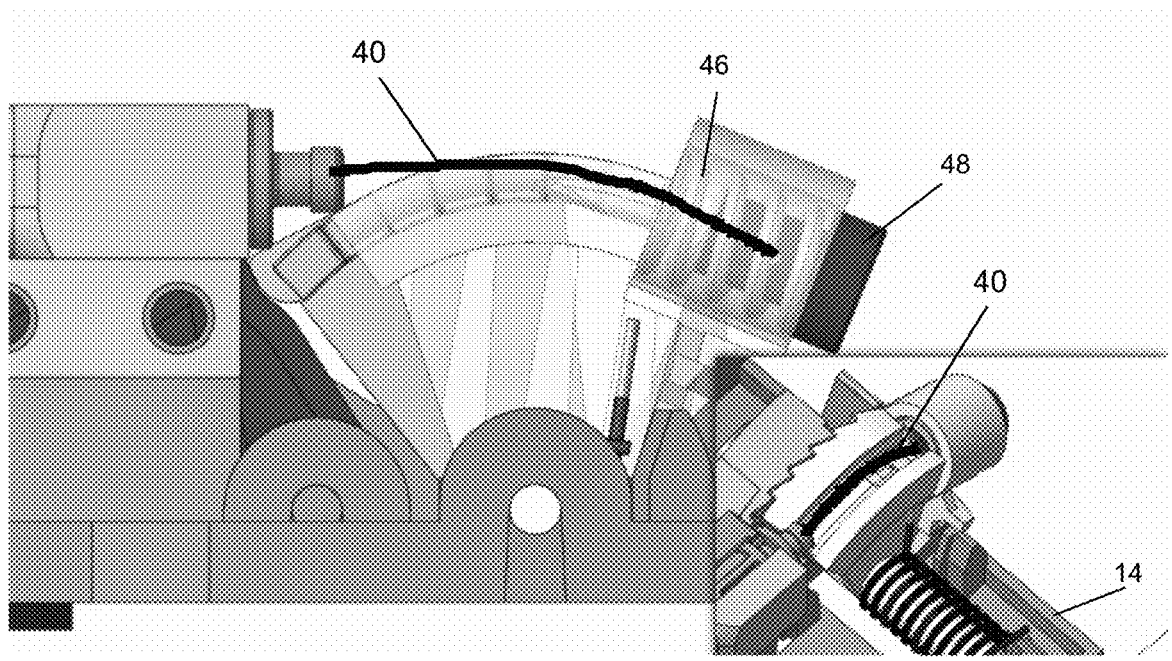
FIG. 20 is an enlarged view of the connection mechanism in a ratcheted position, shown with the handle portion in the partially deployed position.
FIG. 20A is a perspective view of the connection mechanism of FIG. 20.
Figures 21, 21A:
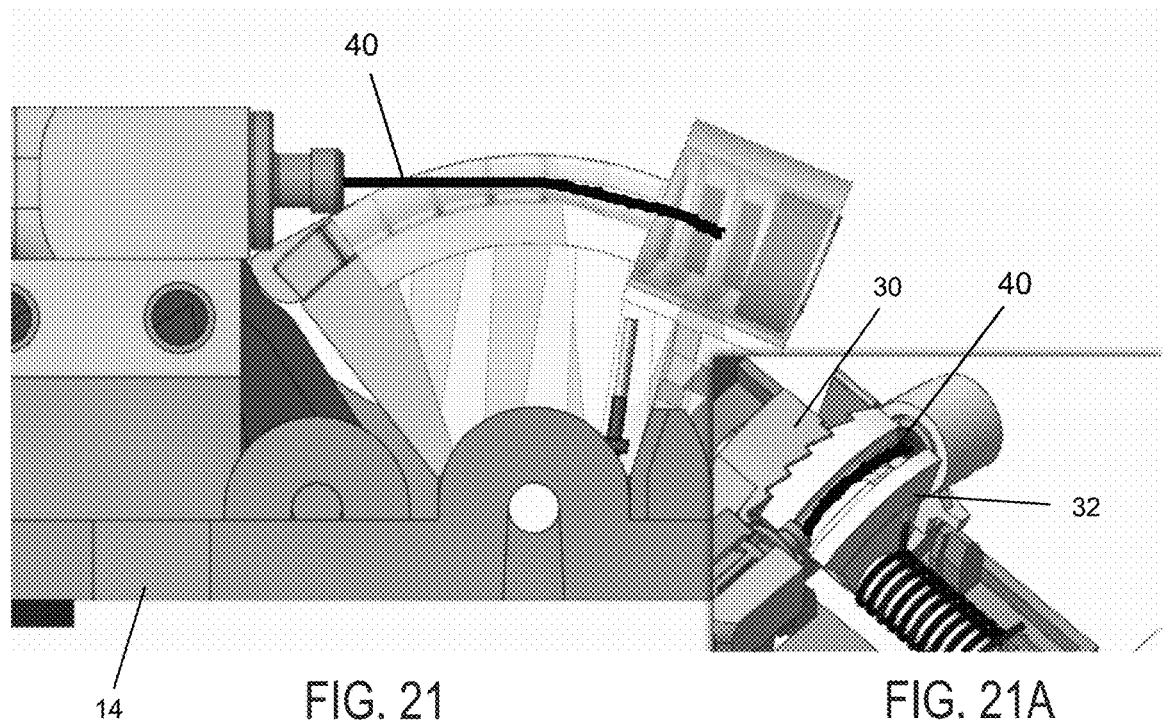
FIG. 21 is an enlarged view of the connection mechanism in a ratcheted position, shown with the handle portion in the fully deployed position.
FIG. 21A is a perspective view of the connection mechanism of FIG. 21.

Optionally, and such as shown in FIGS. 16-21A, the inner cable 40 may be connected to the connection arm or element 36 of the connection portion 32 via a spring-biased connection pin 46. After the handle is moved to its deployed position (FIG. 17), the pin 46 compresses a spring 48 (which applies a greater force against the cable end than the force applied by the torsion spring) and the motor is cinched (FIG. 18).

Thus, the connection mechanism 28 enables an actuator 20 mounted remote from the door handle region of the door to operably move the handle portion 16 between the recessed position and the deployed position by pulling or applying tension via the cable 40. The connection mechanism 28 is connected to the actuator via the cable 40 and includes a detent or ratchet design and a biasing element 42 that biases the detent or ratchet interface into engagement to maintain tension in the cable. The actuator is operated to pull the cable, which pulls at the connection portion 32 engaging the ratcheting portion 30, whereby the connection mechanism 28 collectively pivots and engages the crank to deploy the handle. When the actuator is operated in the opposite direction, tension in the cable is released and the torsional spring 42 urges the connection portion 32 to pivot in the opposite direction to retract the handle. If, after the handle is fully retracted, there is slack in the cable (or tension in the cable is less than a threshold level), the connection portion 32 ratchets (relative to the ratchet portion 30) to take up the slack and maintain tension on the cable.

Figure 22:
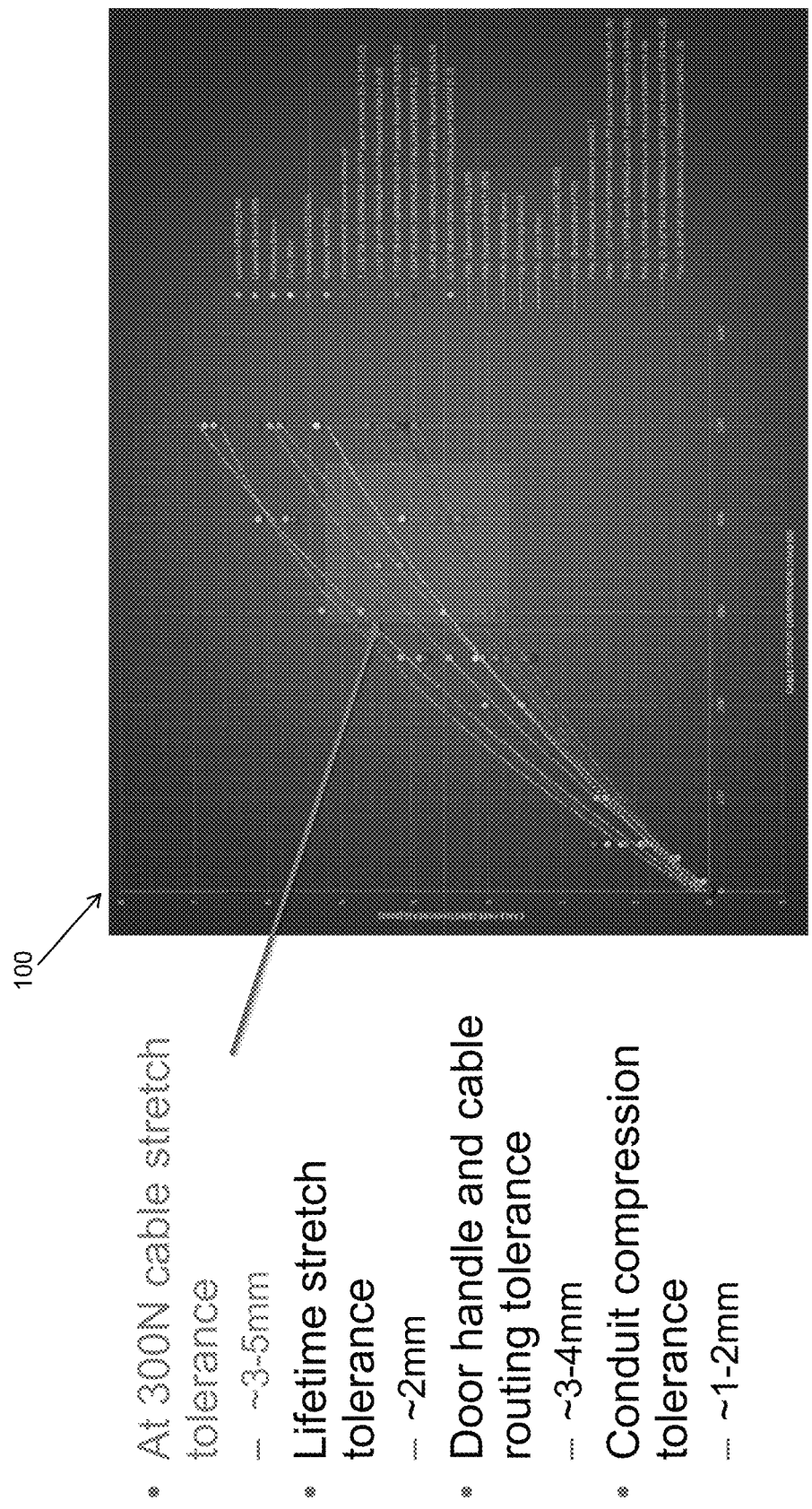
FIG. 22 is a diagram plotting the length increase of various cables as a load on the cables increases.
Figure 23:
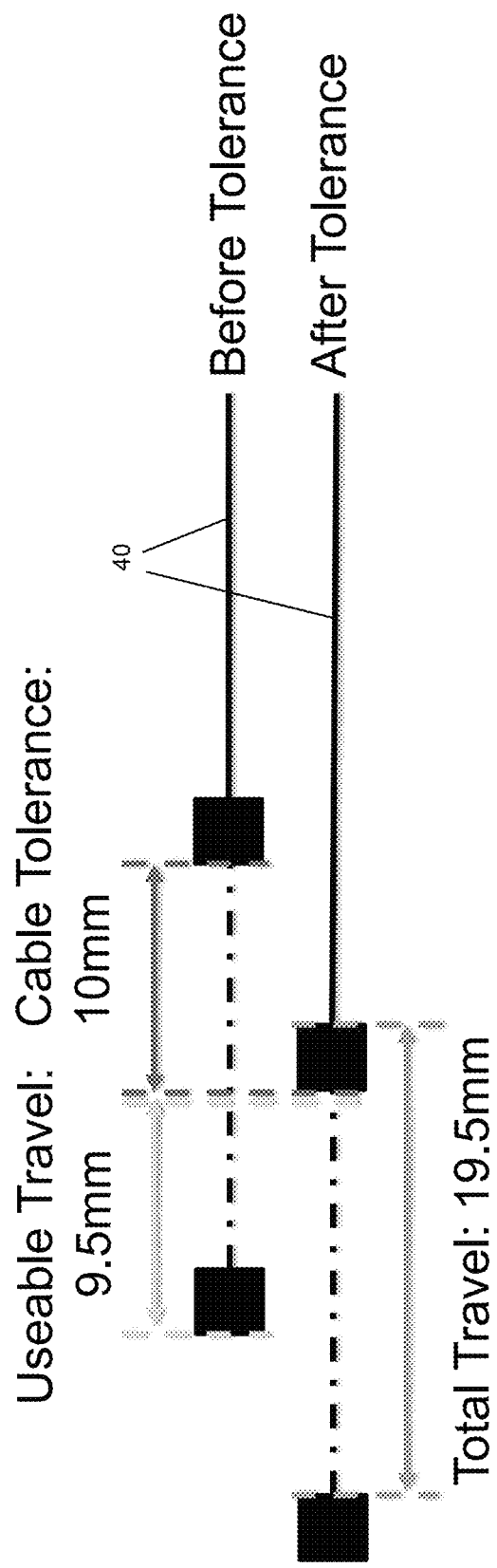
FIG. 23 is a diagram showing the total travel of a cable before and after tolerance.

As shown in FIGS. 22 and 23, the cable 40 may lose tension or weaken over time, such as due to a cable stretch tolerance (such as about 3 to 5 mm), a lifetime stretch tolerance (such as about 2 mm), a door handle and/or cable routing tolerance (such as about 3 to 4 mm), and/or a conduit compression tolerance (such as about 1 to 2 mm). FIG. 22 depicts a graph 100 of the length increase of various cables when a compression load (such as 300 N) is applied. Elements of the cable 40 and/or torsion spring 42 may balance or align or coordinate the biasing forces of the torsion spring and inner cable at the connection mechanism 28 over the life of the door handle assembly. Before tolerance (i.e., before characteristics of the handle assembly result in cable stretch), the cable tolerance may be 10 mm and there may be 9.5 mm of useable travel, resulting in total travel from the actuator after tolerance of 19.5 mm.

Figure 24A:
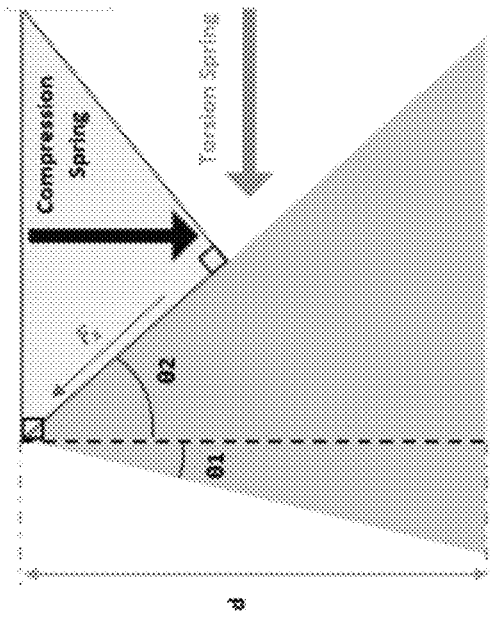
FIG. 24A is a diagram including formulas for determining the biasing forces of the torsion spring and the connection cable at the connection mechanism.
Figure 24:
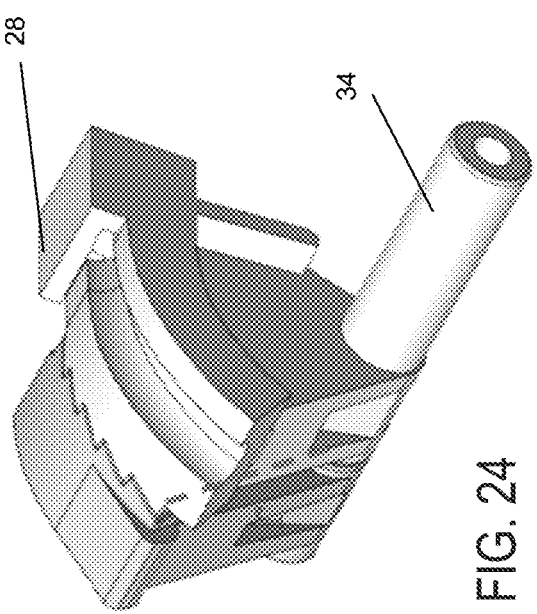
FIG. 24 is a perspective view of the connection mechanism, showing the radius between the pivot and the connection cable.
Figure 25:
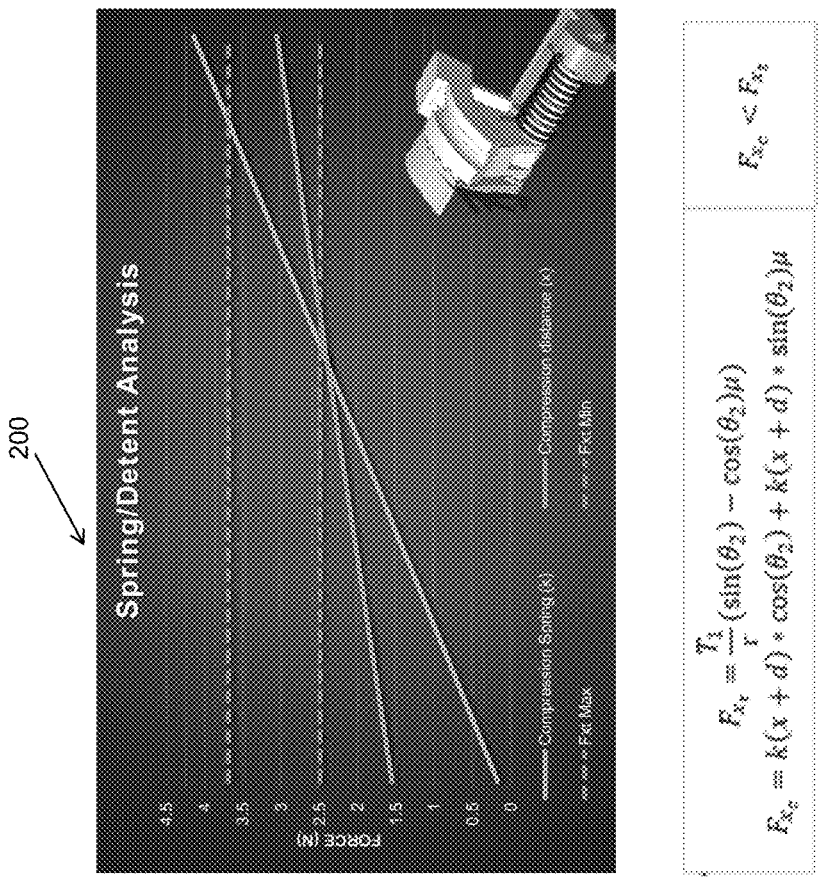
FIG. 25 is a diagram plotting the biasing force of the torsion spring at the connection mechanism.

As shown in FIGS. 24-25, the connection mechanism 28 and the biasing member 42 are configured to accommodate the characteristics of the cable 40 to maintain the tension in the cable. As discussed above, the biasing member 42 may comprise a torsion spring that biases against the tension in the cable in the first direction, and the biasing member 42 may also provide (or another biasing element may provide) a compression force to bias the ratcheting portion 30 and the connection portion 32 into engagement. To pivot the connection portion 32 relative to the ratchet portion 30 in the first direction, the force of the biasing member 42 in the first direction must overcome the compression force and the tension in the cable 40. The system may be configured so that the connection mechanism 28 ratchets only when there is slack in the cable (i.e., no tension). In other words, the cable tension that the torsion spring must overcome to ratchet the connection portion 32 is negligible and the biasing force of the biasing member or torsion spring in the first direction must only overcome the compression force to partially separate the connection portion and the ratchet portion as they move relative to one another along the ramped teeth of the ratchet interface.

For example, a first equation may determine the force $F_{xt}$ of the biasing member 42 biasing the connection mechanism 28 in the first direction and a second equation may determine the compression force $F_{xc}$ biasing the ratcheting portion 30 and connection portion 32 into engagement. When $F_{xt}$ is greater than $F_{xc}$, the torsion spring is sufficient to pivot the connection portion 32 relative to the ratcheting portion 30 to the next detent position. Inputs for the equations may include a radius or distance from the pivot 34 of the connection cable at the connection mechanism and 82, the angle of the tolerance detent (i.e., the angle of the stepped or toothed relationship between the connection portion and the ratcheting portion). The tolerance detent has a higher angle (such as greater than about 60 degrees, such as, for example, about 72 degrees), which results in lower torsion effort needed to overcome the detent and a lower number of detents. The distance from the pivot has a negative effect on $F_{xt}$ and allows for more detent positions as the distance from the pivot increases. For example, the radius may be 29.47 mm or any suitable distance. As shown by the graph 200, the system may be configured so that $F_{xt}$ has a minimum value of about 2.5 N and a maximum value of about 3.75 N.

By providing a flush or generally flush or recessed handle, the door handle assembly reduces air drag and enhances the aerodynamic performance of the equipped vehicle with a potential for enhanced fuel economy for the vehicle. The extension of the handle from its recessed position to its partially extended or graspable position may be responsive to any suitable trigger or signal or the like. For example, the handle may extend to its graspable position responsive to a touch or proximity of a person's hand at the door handle or at the door or the like (such as via responsive to a touch or proximity sensor disposed at the vehicle door at or near the door handle). Optionally, the movement of the handle to its partially extended graspable position may be responsive to a signal received from a remote transmitting device, such as a key fob or identifying device or the like (and the signal may comprise a radio frequency signal or infrared signal or any suitable signaling means), or may be responsive to a human action at the door (such as a touch and/or proximity of a person or person's hand at the door or door handle).

Optionally, the movement of the door handle to its partially extended or graspable position may be done in conjunction with other functions, such as activation of one or more vehicle exterior lights (such as ground illumination lights or headlights or turn signal lights or the like) or such as activation of one or more vehicle interior lights or such as actuation of the vehicle horn or other signal to alert the user that the door handle is moved to its graspable position. Control circuitry or logic to provide the dual or multiple functions can piggyback on one common control system.

Optionally, the control circuitry or logic to control or extend the handle portion may include a lockout function so that the control will not and cannot extend the handle when it is not appropriate to open the door of the vehicle. For example, the lockout function may limit or preclude extension of the door handle when the vehicle is in a forward or reverse gear or when the vehicle ignition is on or following a period of time (such as about twenty seconds or more or less) after the vehicle ignition is turned on or when the vehicle is moving at or above a threshold speed (such as, for example, at or above about three mph or about five mph or other selected threshold vehicle speed) or the like. When one or more of these conditions (and optionally one or more other conditions depending on the particular application) is detected, the control limits or precludes extension of the handle to its graspable position irrespective of receipt of other inputs, such as a door unlock button actuation or a passive entry system signal or the like.

Optionally, the door handle assembly and/or the vehicle door may include a control or control module for operating and controlling the actuator (and/or other devices or functions of the door or vehicle). For example, the door or door handle assembly may include a control module that utilizes aspects of the control modules disclosed in U.S. Pat. Publication No. US-2010-0007463, which is hereby incorporated herein by reference in its entirety.

Although shown as a strap type handle, the handle assembly may comprise any suitable type of vehicle door handle assembly, such as a paddle type vehicle door handle assembly (having a paddle or handle portion that is pivotable about a generally horizontal pivot axis to open the vehicle door) and/or such as a handle assembly of the types described in U.S. Pat. Nos. 6,349,450; 6,550,103 and/or 6,907,643, which are hereby incorporated herein by reference in their entireties) or other type of vehicle door handle assembly. Optionally, the door handle assembly may include a soft touch handle portion, such as utilizing the principles described in U.S. Pat. Nos. 6,349,450; 6,550,103 and/or 6,907,643, incorporated above.

Optionally, the door handle assembly may include an antenna or the like, such as for sensing or transmitting signals, such as described in U.S. Pat. No. 6,977,619, which is hereby incorporated herein by reference in its entirety. For example, the handle assembly may include an antenna or sensor (such as an antenna and/or capacitive sensor) at the handle portion and/or may include a passive entry device or element. The antenna or sensor and/or passive entry device may receive a signal from a transmitting device (such as from a key fob or the like carried by the driver of the vehicle) and/or may sense or detect the presence of or proximity of a person or person's hand at or near the door handle, and may generate an output signal indicative of such detection. The actuator may be responsive to the antenna and/or sensor and/or device to impart an outward movement of the door handle portion so that the user can grasp the handle portion to open the door of the vehicle.

Optionally, the extendable flush door handle assembly may provide an energy generating feature. For example, the handle can act as a generator to create energy for the use of powering emergency devices (such as, for example, an electric latch, lighting, and/or the like) on a vehicle when the vehicle battery is low in power. By using an actuator with a back drivable gear train, the user could cycle the handle manually and generate power by rotating a motor. Other power generation methods could include, but are not limited to, power savaging, induction coils, Piezo electric materials, a pre-charged capacitor, Peltier devices, and/or power transfer from external devices. The generated power can be stored in one or more batteries or capacitors disposed at the vehicle door or in the vehicle.

Optionally, the extendable flush door handle assembly may provide one or more bumpers, which can be used to reduce the sound that the handle makes while returning to its closed or flush position. The bumpers can be placed to maintain the gap between the handle and the sheet metal of the vehicle door when the handle is in its flush position.

Although shown and described as being a generally horizontally oriented handle portion that pivots about a generally vertical pivot axis, it is envisioned that the handle of the extendable flush door handle assembly may be oriented in any manner. For example, the handle may be oriented so that it is either vertical, horizontal, or diagonal with respect to the ground. Also, although shown and described as an exterior door handle for opening a side door or rear door or lift gate of a vehicle from exterior the vehicle, it is envisioned that the extendable flush door handle assembly may be suitable for use as an interior handle for opening a side door or rear door or liftgate of a vehicle from inside the vehicle.

Optionally, the door handle assembly or module may incorporate other features or accessories, such as, for example, a blind spot indicator device or element and/or a turn signal indicator device or element, such as by utilizing aspects of the devices described in U.S. Pat. Nos. 8,786,704; 8,058,977; 7,944,371; 7,492,281; 6,198,409; 5,929,786 and/or 5,786,772, which are hereby incorporated herein by reference in their entireties. The signal indicator or indication module may include or utilize aspects of various light modules or systems or devices, such as the types described in U.S. Pat. Nos. 7,626,749; 7,581,859; 6,227,689; 6,582,109; 5,371,659; 5,497,306; 5,669,699; 5,823,654; 6,176,602 and/or 6,276,821, which are hereby incorporated herein by reference in their entireties.

Optionally, the door handle assembly or module may include or may be associated with an antenna for receiving signals from or communicating with a remote device. For example, the antenna (such as, for example, an antenna of the types described in U.S. Pat. No. 6,977,619, which is hereby incorporated herein by reference in its entirety) may communicate a signal to the door locking system via a wire connection or the like, or wirelessly, such as via a radio frequency signal or via an infrared signal or via other wireless signaling means. Such connections can include cables, wires, fiber optic cables or the like. The communication to the locking system may be via a vehicle bus or multiplex system, such as a LIN (Local Interconnect Network) or CAN (Car or Controlled Area Network) system, such as described in U.S. Pat. Nos. 6,291,905; 6,396,408 and/or 6,477,464, which are all hereby incorporated herein by reference in their entireties. The vehicle door may then be unlocked and/or the illumination source or sources may be activated as a person carrying a remote signaling device approaches the door handle. Optionally, other systems may be activated in response to the remote signaling device, such as vehicle lighting systems, such as interior lights, security lights or the like (such as security lights of the types disclosed in U.S. Pat. Nos. 6,280,069; 6,276,821; 6,176,602; 6,152,590; 6,149,287; 6,139,172; 6,086,229; 5,938,321; 5,671,996; 5,497,305; 6,416,208 and/or 6,568,839, all of which are hereby incorporated herein by reference in their entireties), or the vehicle ignition, or any other desired system.

Changes and modifications to the specifically described embodiments may be carried out without departing from the principles of the present invention, which is intended to be limited only by the scope of the appended claims as interpreted according to the principles of patent law.

The invention claimed is:

1. A vehicular exterior door handle assembly, the vehicular exterior door handle assembly comprising:
   a base portion disposed at a door handle region of a vehicle door;
   a handle portion movable relative to the base portion between (i) a recessed position, where a grasping portion of the handle portion is recessed at the base portion, and (ii) a deployed position, where the grasping portion of the handle portion extends outward from the base portion;
   an actuator that is electrically operable to move the handle portion between the recessed position and the deployed position;
   a connection mechanism, wherein, when the actuator is electrically operated, the connection mechanism pivots relative to the base portion to move the handle portion between the recessed position and the deployed position;
   wherein the actuator electrically operates to pull and release a cable to pivot the connection mechanism to move the handle portion between the recessed position and the deployed position;
   wherein the connection mechanism, when the actuator is electrically operated to pull the cable, pivots in a first direction to move the handle portion from the recessed position toward the deployed position;
   wherein the connection mechanism comprises a biasing element that biases the connection mechanism in a second direction to move the handle portion toward the recessed position when the actuator releases the cable; and
   wherein, responsive to tension in the cable being reduced by a threshold amount, the connection mechanism adjusts to increase tension in the cable; and
   wherein the connection mechanism comprises a ratcheting portion and a connection portion, and wherein the connection portion pivots relative to the ratcheting portion when the connection mechanism adjusts to increase tension in the cable.

2. The vehicular exterior door handle assembly of claim 1, wherein the biasing element biases the connection portion in the second direction relative to the ratcheting portion, and wherein the biasing element provides a biasing force that, responsive to tension in the cable being reduced by the threshold amount, pivots the connection portion in the second direction relative to the ratcheting portion to increase tension in the cable.

3. The vehicular exterior door handle assembly of claim 1, wherein a compression element biases the connection portion into engagement with the ratcheting portion and the biasing element biases the connection portion in the second direction relative to the ratcheting portion, and wherein the biasing element provides a biasing force that, responsive to tension in the cable being reduced by the threshold amount such that the biasing force of the biasing element is greater than a sum of tension in the cable and a compression force of the compression element, pivots the connection portion in the second direction relative to the ratcheting portion to increase tension in the cable.

4. The vehicular exterior door handle assembly of claim 3, wherein the biasing element comprises the compression element.

5. The vehicular exterior door handle assembly of claim 1, wherein the connection mechanism comprises a detent engagement surface between the ratcheting portion and the connection portion that allows the connection portion to pivot in the second direction relative to the ratcheting portion and precludes the connection portion from pivoting in the first direction relative to the ratcheting portion.

6. The vehicular exterior door handle assembly of claim 1, wherein the ratcheting portion engages the handle portion to impart pivotal movement of the connection mechanism to move the handle portion between the recessed position and the deployed position.

7. The vehicular exterior door handle assembly of claim 1, wherein the actuator is disposed remote from the door handle region and is electrically operable to cinch a latch mechanism disposed at the vehicle door via a second cable.

8. The vehicular exterior door handle assembly of claim 1, wherein the connection mechanism adjusts to increase tension in the cable to accommodate for a tolerance of the cable.

9. The vehicular exterior door handle assembly of claim 8, wherein the tolerance of the cable is up to 20 mm.

10. The vehicular exterior door handle assembly of claim 1, wherein the connection mechanism adjusts to increase tension in the cable while the handle portion is in the recessed position.

11. A vehicular exterior door handle assembly, the vehicular exterior door handle assembly comprising:
   a base portion disposed at a door handle region of a vehicle door;
   a handle portion movable relative to the base portion between (i) a recessed position, where a grasping portion of the handle portion is recessed at the base portion, and (ii) a deployed position, where the grasping portion of the handle portion extends outward from the base portion;
   an actuator that is electrically operable to move the handle portion between the recessed position and the deployed position;
   wherein the actuator is disposed remote from the door handle region;
   a connection mechanism, wherein, when the actuator is electrically operated, the connection mechanism pivots relative to the base portion to move the handle portion between the recessed position and the deployed position;
   wherein the actuator electrically operates to pull and release a cable to pivot the connection mechanism to move the handle portion between the recessed position and the deployed position;
   wherein the connection mechanism, when the actuator is electrically operated to pull the cable, pivots in a first direction to move the handle portion from the recessed position toward the deployed position;
   wherein the connection mechanism comprises a biasing element that biases the connection mechanism in a second direction to move the handle portion toward the recessed position when the actuator releases the cable;
   wherein, responsive to tension in the cable being reduced by a threshold amount, the connection mechanism adjusts to increase tension in the cable; and wherein the connection mechanism comprises a ratcheting portion and a connection portion, and wherein the connection portion pivots relative to the ratcheting portion when the connection mechanism adjusts to increase tension in the cable.

12. The vehicular exterior door handle assembly of claim 11, wherein the biasing element biases the connection portion in the second direction relative to the ratcheting portion, and wherein the biasing element provides a biasing force that, responsive to tension in the cable being reduced by the threshold amount, pivots the connection portion in the second direction relative to the ratcheting portion to increase tension in the cable.

13. The vehicular exterior door handle assembly of claim 11, wherein the connection mechanism comprises a detent engagement surface between the ratcheting portion and the connection portion that allows the connection portion to pivot in the second direction relative to the ratcheting portion and precludes the connection portion from pivoting in the first direction relative to the ratcheting portion.

14. The vehicular exterior door handle assembly of claim 11, wherein the ratcheting portion engages the handle portion to impart pivotal movement of the connection mechanism to move the handle portion between the recessed position and the deployed position.

15. The vehicular exterior door handle assembly of claim 11, wherein the connection mechanism adjusts to increase tension in the cable while the handle portion is in the recessed position.

16. A vehicular exterior door handle assembly, the vehicular exterior door handle assembly comprising:
   a base portion disposed at a door handle region of a vehicle door;
   a handle portion movable relative to the base portion between (i) a recessed position, where a grasping portion of the handle portion is recessed at the base portion, and (ii) a deployed position, where the grasping portion of the handle portion extends outward from the base portion;
   an actuator that is electrically operable to move the handle portion between the recessed position and the deployed position;
   a connection mechanism, wherein, when the actuator is electrically operated, the connection mechanism pivots relative to the base portion to move the handle portion between the recessed position and the deployed position;
   wherein the actuator electrically operates to pull and release a cable to pivot the connection mechanism to move the handle portion between the recessed position and the deployed position;
   wherein the connection mechanism, when the actuator is electrically operated to pull the cable, pivots in a first direction to move the handle portion from the recessed position toward the deployed position;
   wherein the connection mechanism comprises a biasing element that biases the connection mechanism in a second direction to move the handle portion toward the recessed position when the actuator releases the cable;
   wherein the connection mechanism comprises a ratcheting portion and a connection portion;
   wherein the biasing element biases the connection portion in the second direction relative to the ratcheting portion, and wherein the biasing element provides a biasing force that, responsive to tension in the cable being reduced by a threshold amount, pivots the connection portion in the second direction relative to the ratcheting portion to increase tension in the cable; and
   wherein the connection mechanism comprises a detent engagement surface between the ratcheting portion and the connection portion that allows the connection portion to pivot in the second direction relative to the ratcheting portion and precludes the connection portion from pivoting in the first direction relative to the ratcheting portion.

17. The vehicular exterior door handle assembly of claim 16, wherein the ratcheting portion engages the handle portion to impart pivotal movement of the connection mechanism to move the handle portion between the recessed position and the deployed position.

18. The vehicular exterior door handle assembly of claim 16, wherein the actuator is disposed remote from the door handle region.

19. The vehicular exterior door handle assembly of claim 18, wherein the actuator is electrically operable to cinch a latch mechanism disposed at the vehicle door via a second cable.

20. The vehicular exterior door handle assembly of claim 16, wherein the connection portion pivots in the second direction relative to the ratcheting portion to increase tension in the cable while the handle portion is in the recessed position.

* * * * *

UNITED STATES PATENT AND TRADEMARK OFFICE
CERTIFICATE OF CORRECTION

PATENT NO. : 12,196,012 B2
APPLICATION NO. : 17/814237
DATED : January 14, 2025
INVENTOR(S) : Connor G. Cervone Page 1 of 1

It is certified that error appears in the above-identified patent and that said Letters Patent is hereby corrected as shown below:

In the Specification

<u>Column 8</u>
Line 30, "mechanism and 82" should be --mechanism and $\theta_2$--

In the Claims

<u>Column 11</u>
Lines 41-42, Claim 1, "cable; and" should be --cable;--

Signed and Sealed this
Eleventh Day of February, 2025

Coke Morgan Stewart
*Acting Director of the United States Patent and Trademark Office*